(12) United States Patent
Channabasavaiah et al.

(10) Patent No.: US 10,038,760 B2
(45) Date of Patent: Jul. 31, 2018

(54) SYSTEM AND METHOD TO SUPPORT CODEC DELIVERY MODELS FOR IMS NETWORKS

(75) Inventors: Kishore Channabasavaiah, Palatine, IL (US); Stephen E. Jaffe, Canton, GA (US); Brian T. Paulsen, Overland Park, KS (US); Sri Ramanathan, Lutz, FL (US); Matthew A. Terry, Dunwoody, GA (US); Matthew B. Trevathan, Kennesaw, GA (US); Raghu Varadan, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 469 days.

(21) Appl. No.: 12/475,973

(22) Filed: Jun. 1, 2009

(65) Prior Publication Data

US 2010/0306074 A1    Dec. 2, 2010

(51) Int. Cl.
*H04L 29/08*    (2006.01)
*H04N 7/173*    (2011.01)
(Continued)

(52) U.S. Cl.
CPC ............ *H04L 67/34* (2013.01); *G06Q 40/12* (2013.12); *H04L 65/604* (2013.01); *H04N 7/17318* (2013.01); *H04N 21/6581* (2013.01); *H04N 21/8193* (2013.01); *H04N 21/8352* (2013.01); *H04L 67/303* (2013.01)

(58) Field of Classification Search
USPC ................. 725/86, 87, 91; 709/217
See application file for complete search history.

(56) References Cited

U.S. PATENT DOCUMENTS 6,216,152 B1    4/2001    Wong et al.
6,477,550 B1    11/2002   Chandrasekar et al.
(Continued)

FOREIGN PATENT DOCUMENTS

CN    101052130 A    10/2007
EP    0911728        4/1999
EP    1853058        11/2007

OTHER PUBLICATIONS

International Search Report for corresponding International Appl. No. PCT/EP2010/056940 dated Nov. 25, 2010.
(Continued)

*Primary Examiner* — Tsan-Yu J Huang
(74) *Attorney, Agent, or Firm* — Christopher McLane; Andrew M. Calderon; Roberts Mlotkowski Safran Cole & Calderon, P.C.

(57) ABSTRACT

An architecture (system) and method is provided for transcoding codec information to be sent in a Session Initiation Protocol (SIP) signaling stream for rendering rich digital media content. The method is implemented on a computer infrastructure and includes: determining a codec associated with content to be sent to one or more requesting devices; determining that at least one of the one or more requesting devices do not have the codec associated with the content to be sent to the one or more requesting devices; providing codec information to the at least one of the one or more requesting devices; and sending the content to the one or more requesting devices.

10 Claims, 4 Drawing Sheets

Figure 1:
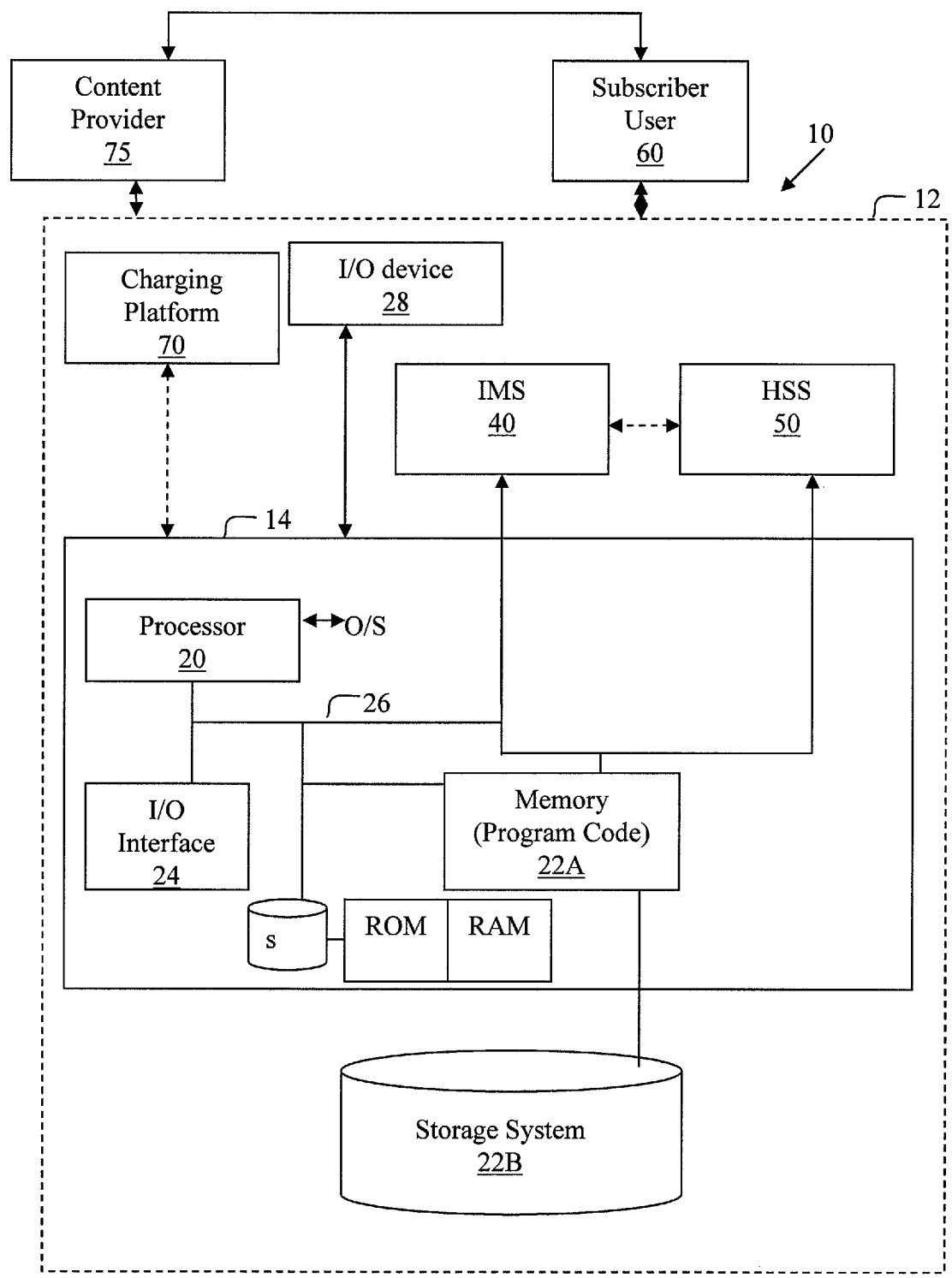

(51) Int. Cl.
*H04N 21/658* (2011.01)
*H04N 21/81* (2011.01)
*H04N 21/8352* (2011.01)
*H04L 29/06* (2006.01)
*G06Q 40/00* (2012.01)

(56) References Cited

U.S. PATENT DOCUMENTS

| | | |
|---|---|---|
| 6,704,864 B1 | 3/2004 | Philyaw |
| 7,170,863 B1 | 1/2007 | Denman |
| 7,231,420 B2 | 6/2007 | Bach Corneliussen |
| 7,301,913 B2 | 11/2007 | Corrao et al. |
| 7,310,532 B2 | 12/2007 | Knauerhase et al. |
| 2001/0016836 A1* | 8/2001 | Boccon-Gibod .. G06Q 20/3829 705/51 |
| 2002/0007357 A1 | 1/2002 | Wong et al. |
| 2002/0112171 A1* | 8/2002 | Ginter ............... G06F 21/10 713/185 |
| 2002/0181495 A1 | 12/2002 | Requena et al. |
| 2003/0050058 A1 | 3/2003 | Walsh et al. |
| 2003/0073440 A1* | 4/2003 | Mukherjee ............ H04L 29/06 455/435.1 |
| 2004/0148362 A1* | 7/2004 | Friedman .............. H04L 29/06 709/217 |
| 2006/0168323 A1* | 7/2006 | Kim ................. H04L 29/06027 709/238 |
| 2007/0061397 A1 | 3/2007 | Gregorat et al. |
| 2007/0076855 A1 | 4/2007 | MeLampy et al. |
| 2007/0087731 A1 | 4/2007 | Karlsson et al. |
| 2007/0094691 A1 | 4/2007 | Gazdzinski |
| 2007/0133516 A1 | 6/2007 | Stein |
| 2007/0150479 A1* | 6/2007 | Issa ................. G06F 17/30997 |
| 2007/0156909 A1 | 7/2007 | Osborn et al. |
| 2007/0165836 A1 | 7/2007 | Jiang |
| 2007/0204311 A1 | 8/2007 | Hasek et al. |
| 2007/0220163 A1 | 9/2007 | Khouderchah et al. |
| 2007/0258481 A1 | 11/2007 | Ko et al. |
| 2007/0264985 A1 | 11/2007 | Kapur et al. |
| 2007/0270123 A1 | 11/2007 | Cai et al. |
| 2007/0277199 A1* | 11/2007 | Yoon ................. H04N 5/44513 725/39 |
| 2007/0282911 A1 | 12/2007 | Bantukul et al. |
| 2008/0177865 A1 | 7/2008 | Heo et al. |
| 2008/0201748 A1* | 8/2008 | Hasek ............... H04N 7/17309 725/98 |
| 2009/0100147 A1 | 4/2009 | Igarashi |
| 2009/0125951 A1* | 5/2009 | Agricola ............ H04N 7/17354 725/91 |
| 2009/0154556 A1* | 6/2009 | Kim .................... H04L 65/1083 375/240.02 |
| 2009/0193100 A1* | 7/2009 | Moradi .............. H04N 7/17318 709/219 |

OTHER PUBLICATIONS

Written Opinion for corresponding International Appl. No. PCT/EP2010/056940 dated Nov. 25, 2010.

C. Guerrero et al., "QoS Management in Fixed Broadband Residential Gateways", SpringerLink, URL: http://www.springerlink.com/content/y57p8722538n56v5/; SpringerLink Date Oct. 17, 2005; Lecture Notes in Computer Science, vol. 3754/2005 (3 pages).

D. Roxburgh et al., "Reachability in converged IMS services—a BT Alcatel-Lucent collaboration", SpringerLink, URL: http://www.springerlink.com/content/55284v6624qt2961/, SpringerLink Date Jun. 22, 2007; BT Technology Journal, vol. 25, No. 2, Apr. 2007 (Introduction).

Reichl et al., "Practical Experiences With an IMS-Aware Location Service Enabler on Top of an Experimental Open Source IMS Core Implementation", Journal of Mobile Multimedia, vol. 2, No. 3, 2006, pp. 189-224.

Chinese Office Action dated Oct. 10, 2013, for related Application No. 201080017945.4, 8 pages.

Office Action in related U.S. Appl. No. 13/471,880 dated Nov. 25, 2016, 10 pages.

Office Action in related U.S. Appl. No. 13/479,416 dated Dec. 8, 2016, 18 pages.

Office Action dated Sep. 11, 2015 in related U.S. Appl. No. 13/471,880, 15 pages.

Office Action dated Oct. 22, 2015 in related U.S. Appl. No. 13/479,416, 18 pages.

Final Office Action dated Mar. 21, 2016 in related U.S. Appl. No. 13/471,880, 14 pp.

Final Office Action dated Apr. 20, 2016 in related U.S. Appl. No. 13/479,416, 20 pages.

Office Action in related U.S. Appl. No. 13/479,416 dated Apr. 6, 2018, 26 pages.

Office Action in related U.S. Appl. No. 13/471,880 dated Apr. 9, 2018, 8 pages.

\* cited by examiner

SYSTEM AND METHOD TO SUPPORT CODEC DELIVERY MODELS FOR IMS NETWORKS

FIELD OF THE INVENTION

The invention generally relates to a method and system of transcoding codec information and, in particular, to an architecture and method for transcoding codec information to be sent in a Session Initiation Protocol (SIP) signaling stream for rendering rich digital media content.

BACKGROUND

Transcoding is a key technology that is widely used in the telecommunications and Media and Entertainment domains. Trancoding may be used for converting visual media from one type to another, e.g., from MPEG to a GIF format, in order to support rendering on a legacy device. The transcoding may also be used for converting audio media from one type to another, e.g., from a polyphonic ring-tone to a simpler ring-tone which is non polyphonic, in order to support a legacy device. Additionally, transcoding may be used to provide the ability to support a baselined piece of content and use this to drive conversion into different formats by using standard codec based conversion algorithms.

In typical commercial deployments, transcoding engines operate in two primary modes, e.g., offline and online. In the offline mode, all the content that has to be transcoded is performed in an offline mode and made available to the user. As an example, an offline mode may include converting a base polyphone ringtone into 32 different targets of tones that can be rendered on 32 types of handsets that is supported by the network carrier. With this approach, the runtime call flow is less computationally intensive, but there is a need to account for and possibly accommodate for extra storage to store transcoded target state formats for a single baselined piece of content. Also, in legacy devices, the device must first know the content, actively search for an appropriate codec to play the content and then download the codec prior to playing. This is a time consuming and processing intensive process.

In the online mode, conversion happens as part of the service call flow. With respect to online transcoding, while the services call flow is more computationally intensive, there is less storage capacity typically required by the network carrier. This is because most online deployment models transcode content on the fly. Also, as noted above, the device must first know the content, actively search for an appropriate codec to play the content and then download the codec prior to playing. This is a time consuming and processing intensive process.

SUMMARY

In a first aspect of the invention, a method is implemented on a computer infrastructure and comprises: determining a codec associated with content to be sent to one or more requesting devices; determining that at least one of the one or more requesting devices do not have the codec associated with the content to be sent to the one or more requesting devices; providing codec information to the at least one of the one or more requesting devices; and sending the content to the one or more requesting devices.

In another aspect of the invention, a computer program product comprises a computer usable storage medium having readable program code tangibly embodied in the storage medium. The computer program product is operable to: receive a request for content from one or more devices; determine a codec for the content; and send the content and codec information to the one or more devices for playing of the content.

In another aspect of the invention, a system for providing codec information to one or more devices. The system comprises a computer infrastructure operable to: receive a request for content from one or more devices; determine a codec for the content; and send the content and the codec to the one or more devices for playing of the content.

In another aspect of the invention, a system comprises a SIP application server. The SIP application server is configured to: register with a content source; receive registration information from one or more subscribers; process content from the content source; determine or receive codec information for the content source related to the content; determine that the one or more subscribers require the codec on a device for playing the content; and one of send the codec to the device for playing the content and send a reference to the codec to the device so that the codec can be downloaded offline from the SIP application from a codec cache.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

FIG. 1 shows an illustrative environment for implementing processes in accordance with the present invention;

FIG. 2 shows an exemplary architect implementing aspects of the present invention;

FIG. 3 is a swim lane diagram showing a process in accordance with aspects of the present invention; and FIG. 4 is a swim lane diagram showing an overview process in accordance with aspects of the present invention.

DETAILED DESCRIPTION

The invention generally relates to a method and system of transcoding codec information and, in particular, to an architecture and method for transcoding codec information to be sent in a Session Initiation Protocol (SIP) signaling stream for rendering rich digital media content. More specifically, the present invention provides a method and system (architecture) for transcoding codec information sent to devices in a SIP (Session Initiation Protocol) signaling stream for purposes of allowing the devices to render rich digital media content. In embodiments, the SIP signaling stream transmits the codec information as part of a User Datagram Protocol (UDP) package. By implementing the invention, the subscriber device does not have to determine the required codec needed to play the content, and search and download such codec prior to playing the content. As should be understood by those of skill in the art, a codec is a device or program capable of encoding and/or decoding a digital data stream or signal.

In implementation, a SIP Application Server is deployable in an IMS (IP Multimedia Subsystem) network that uses device characteristics from a central device repository to send codec information, e.g., codec or reference to the codec, to subscriber devices offline (as a reference) or online (as the codec) as part of the signaling call flow. In the offline mode, an off-line mechanism (such as HTTP) can be used to retrieve the codec dynamically and automatically, without the requirement of the device knowing the content type. In either scenario, the IMS architecture is utilized to ensure that a subscribing user's device can render rich content without having to itself "know" the type of content that is to be played by the device. Those of skill in the art should understand that IMS is an architectural framework for delivering Internet protocol multimedia to mobile users. To ease the integration with the Internet, IMS as far as possible uses IETF (i.e., Internet) protocols such as Session Initiation Protocol (SIP).

In still further embodiments, the system and method leverages an OMA (Open Mobile Alliance) compliant device profile repository to make codec transmission decisions. The present invention also supports an IMS compliant charging model via Rf (and Ro) diameter sub-protocols.

The system and method of the present invention also provides for a presence triggered communications session architecture that is applicable in IMS and non-IMS networks. In this way, the present invention is network agnostic. The presence based foundational service model can be used to drive other types of services in both IMS and non-IMS networks such as, for example, advertising provided by content providers or services provided by service providers. These services may include, for example, reservation systems and the like. In embodiments, the content and/or services can generate revenue for the service provider (e.g., network carrier).

The present invention does not leverage the SMSC or MMSC infrastructure to enable participation in an IMS network. Instead, the present invention provides a notification model that can drive communications sessions based on status changes. The present invention is also subscriber driven allowing subscribers to use presence to determine appropriate means of playing rich media content of different types on different devices.

In an IMS (IP Multimedia Subsystem) based implementation, the following considerations make transcoding requirements unique. These IMS based considerations include, amongst others:

SIP is the necessary protocol of choice for all Session creation, management and teardown, across multiple media types.

The HSS is one master repository of subscriber information, accessible via the Sh based diameter sub-protocol.

All charging information goes to a charging platform capable of being both Rf (postpaid) and Ro (pre-paid) compliant.

The IMS infrastructure does not completely handle subscriber bandwidth based QoS, allowing for content to be indirectly (or directly) included in the payload of a SIP signaling session.

The need to cater to multiple devices that may or may not be IMS compliant, given the preponderance of legacy handsets in the market.

SIP handsets may not be enabled for RSS and/or ATOM based technology, which typically relies on browser-like elements to support content delivery. Even if an RSS feed is available, the user still has to initiate the process by requesting the latest content.

The processing power of handsets has improved to such an extent that transcoding can be accomplished on the device; instead of having the IMS network perform the "heavy lifting". This model also allows for resource optimization on the IMS network.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server 12 that can perform the processes described herein using the computer program code. In particular, the server 12 may be a SIP application server configured to provide rich media content to a subscribing user 60. In further embodiments, the SIP application server can be a presence server, which provides presence information of a user (subscribing user 60). The server 12 includes a computing device 14, which can be resident on the SIP application server or other third party service provider (any of which is generally represented in FIG. 1).

The server 12 includes an IMS network 40 with a home subscriber server (HSS) 50. In embodiments, the IMS network 40 and HSS 50 may be resident on separate servers. The HSS 50 is a master user database that supports the IMS network entities that handle calls. The HSS 50 contains subscription-related information such as, for example, user profiles, as well as performs authentication and authorization of the subscribing user 60. The HSS 50 also provides information about the user's physical location, in order to provide location-based services. The HSS 50 communicates through the Diameter protocol.

The server 12 (and/or computing device 14) includes a centralized device repository, e.g., storage system 22B. In embodiments, the centralized device repository 22B may be resident on the SIP application server or other third party server, and can be a standard OMA (Open Mobile Alliance) compliant device repository to be accessed by the SIP application server. The centralized device repository 22B is configured to store codec information about the subscribing user 60. This allows the system and method to make codec decisions, e.g., determine/receive the subscribing user needs a codec for a specific content and, if so, provide the codec or a reference to the codec to the user. The SIP application server 12 can also use the HSS 50 to determine other subscriber attributes before determining which codec should be sent to the subscribing user 60.

By way of a non-limiting illustrative example, the device of the subscribing user 60 is turned on and registers with the IMS network 40. In embodiments, a Serving Call Session Control Function (S-CSCF) and the HSS 50 go through an IFC (Initial Filter Criteria) where the subscribing user 60 is registered with the IMS network 40 and authorized for a specific set of services or content. The services and content may be based on the location of the subscribing user 60, as well as the presence information (e.g., type of device used by the subscribing device) of the subscribing user 60. The presence information can be stored in the storage system "S" or database on another presence server, for example.

In embodiments, the subscribing user 60 contacts a content application server 75 to register to be informed about a specific piece or category of content. The SIP application server 12 subscribes to the same content with the content server 75. The SIP application server 12 then decides how to relay the information to the subscribing user 60 based on the information received from the centralized device repository 22B and HSS 50. Illustratively, in addition to determining the actual subset of subscribers that may be interested in the content, the SIP application server 12 determines the type of device of the subscribing user 60 using the standard OMA compliant device repository 22B. In addition to determining the actual device profile, the SIP application server can also make a determination as to the types of codec that may required based on the nature of the rich content and the type of device of the subscribing user 60.

Once the appropriate codec is determined, the SIP application server 12 can send the codec to the subscribing user 60 as part of the SIP Notify Message. The subscribing user 60 then proceeds to receive the content from the content source and dynamically and automatically applies the codec to render the content to the subscriber device 60. In this way, the subscribing user 60 does not have to determine the required codec and search and download the codec prior to playing the content. Content is obtained from a media cache (e.g., storage "S") or directly from the content provider 75 for operational efficiency.

The SIP application server 12 can also determine that the codec has to be sent offline. In this case, a reference to the codec is sent to the subscribing user 60. Using the reference, the subscribing user 60 uses a codec cache to download the content before using the media cache to render the content using the downloaded codec.

The subscribing user 60 can select a particular delivery channel to be notified and receive content, independent of the channel that is being used by the content provider. More specifically, the illustrative environment 10 is configured to allow network based triggers to sense status changes as opposed to the user setting the status. For example, the illustrative environment 10 is configured to infer availability on a particular communications channel or device based on the request of the subscribing user. More specifically, the subscribing user, currently on a handset, can request that the content be viewed on a set top box. The presence server can also automatically and dynamically reroute the content based on a user preference or presence, depending on the preferences provided by the user. This being the case, the codec can be sent directly to the set top box, instead of the handset. In this way the present invention focuses on a notification model that can drive communications sessions based on status changes, while also factoring in location in IMS and non-IMS networks. This allows the illustrative environment to be a presence based foundational service model that could be used to drive other types of services in both IMS and non-IMS contexts.

In yet another embodiment, the system and method provides a charging platform 70 to provide charging models for services rendered. The charging platform 70 may be maintained, deployed, created and/or serviced by the service provider. The charging platform 70 is designed to generate a charging record for services rendered to a subscriber, e.g., the subscribing user 60 will be charged for the services rendered based on the charging model implemented by the system and method of the invention. In embodiments, the service provider can calculate an amount to be charged, based on many different considerations and generate the charging record to be sent to the charging platform 70. In turn, the charging platform 70 can generate an invoice and/or deduct a usage charge from an account of the subscribing user 60. The charging platform 70 also supports flexible charging models supported via an IMS compliant Customer Care Framework (CCF). The charging platform 70 also integrates Rf and Ro in a CCF (Charge Collection Facility) in an IMS network using Diameter.

The computing device 14 also includes a processor 20, memory 22A, an I/O interface 24, and the bus 26. The memory 22A can include local memory employed during actual execution of the program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU. The computing device 14 also includes an I/O device 28. The I/O device 28 can be, for example, any device that enables an individual to interact with the computing device 14 or any device that enables the computing device 14 to communicate with one or more other computing devices using any type of communications link. The external I/O device/resource 28 may be for example, a display of a computing device such as a personal digital assistant (PDA).

In general, the processor 20 executes the computer program code, which is stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. The customer may be, for example, the subscribing user 60. In return, the service provider can receive payment from the customer(s) under a subscription and/or fee agreement and/or the service provider can receive payment.

Exemplary Architecture

Figure 2:
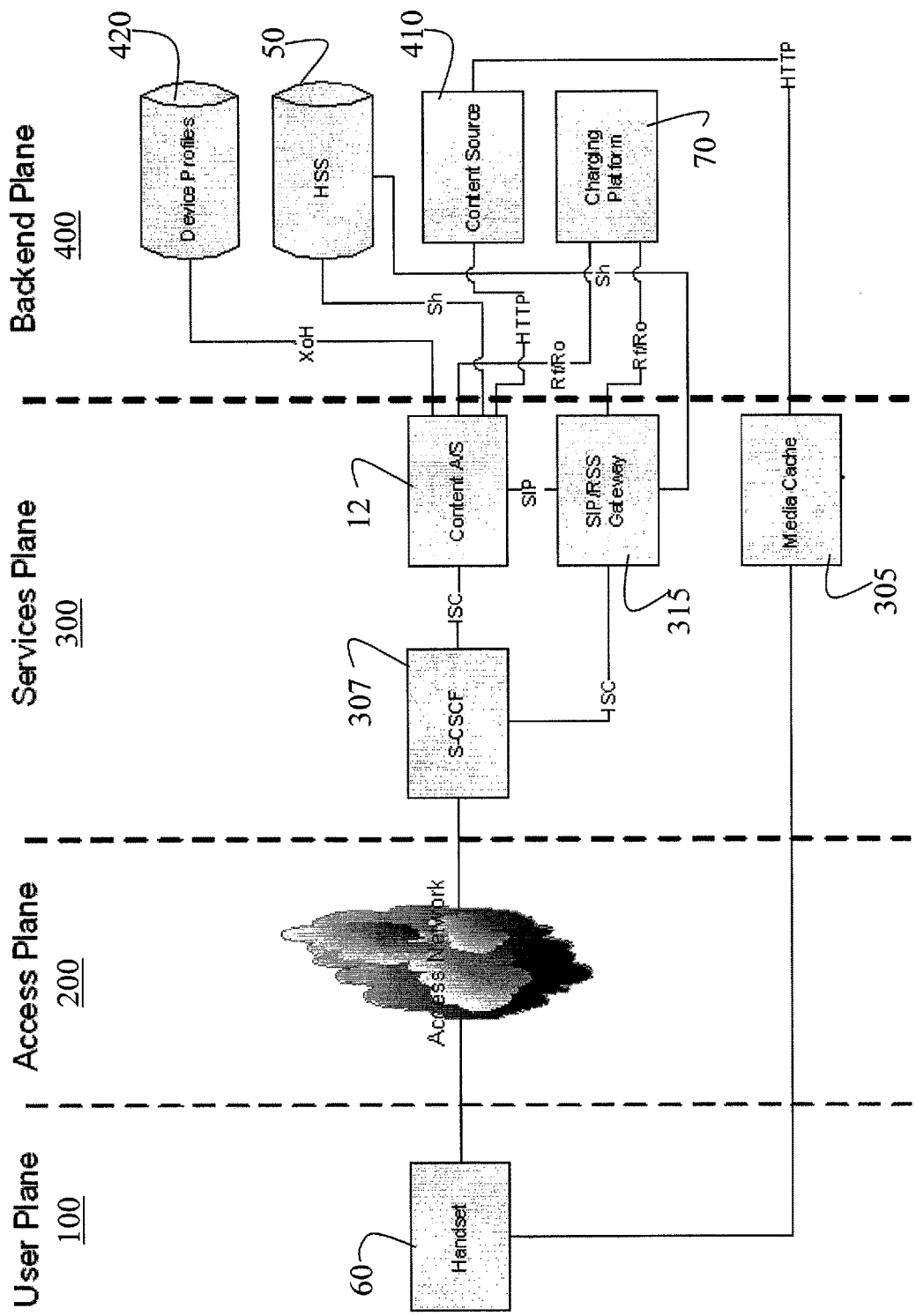

FIG. 2 shows an exemplary architecture in accordance with aspects of the invention. In particular, FIG. 2 shows a user plane 100, an access plane 200, a services plane 300 and a back end plane 400. The client plane 100 can include any number of different network devices (e.g., subscribing user 60) such as, for example, (i) MMS handset; (ii) SIP handset; (iii) SMS handset; (iv) WAP handset; (v) SOAP/REST based application; and/or (vi) XMPP/SIP IM based device. The network device 60 communicates with the access plane 200 and a media cache 305 in the services plane 300. The access plane 200 primarily depicts the mechanisms such as, for example, the Internet, through which the physical network is realized.

The services plane 300 contains portions of the S-CSCF (Call Session Control Function), P-CSCF and I-CSCF (collectively referred to as *CSCF and represented collectively at reference numeral 307). The *CSCF 307 mediates interactions to IMS applications via an ISC layer. More specifically, the Proxy-CSCF (P-CSCF) is a SIP proxy that is the first point of contact for the IMS terminal. The Serving-CSCF (S-CSCF) is the central node of the signaling plane. The S-CSCF is located in the home network and uses Diameter Cx and Dx interfaces to the HSS 50 to download and upload user profiles. In embodiments, all necessary information is loaded from the HSS 50. The Interrogating-CSCF (I-CSCF) is another SIP function located at the edge of an administrative domain. The IP address of the I-CSCF is published in the Domain Name System (DNS) of the domain so that remote servers can find it, and use it as a forwarding point (e.g., registering) for SIP packets to this domain. The I-CSCF queries the HSS using the Diameter Cx interface to retrieve the user location, and then routes the SIP request to its assigned S-CSCF.

The services plane 300 also includes the SIP application server 12 (also referred to as the content application server) 12 and RSS to SIP gateway 315. The SIP application server 12 provides the processes of determining, for example, the type of device used by the subscribing user, the content to distribute to the subscribing user and the required codec to play the content. In embodiments, the centralized device repository 22B may be resident on the SIP application server, which is configured to store codec information about the subscribing user 60. This allows the system and method of the present invention to make codec decisions and then use the HSS 50 (in the backend plane 400) to determine other subscriber attributes before determining which codec should be sent to the subscribing user.

The backend plane 400 includes the IMS compliant (CCF) charging platform 70, the HSS 50 for subscriber profile information, the actual content source 410 and the device profile repository 420. In embodiments, the device profile repository 420 may be resident in the services plane 300. In either implementation, the device profile repository 420 stores user profiles including the codec information about the subscribing user 60. In such implementation, the SIP application server 12 will use such information to determine if the subscribing user requires a codec for a specific type of content and, if so, provide the codec to the subscribing user.

Exemplary Processes

Figure 3:
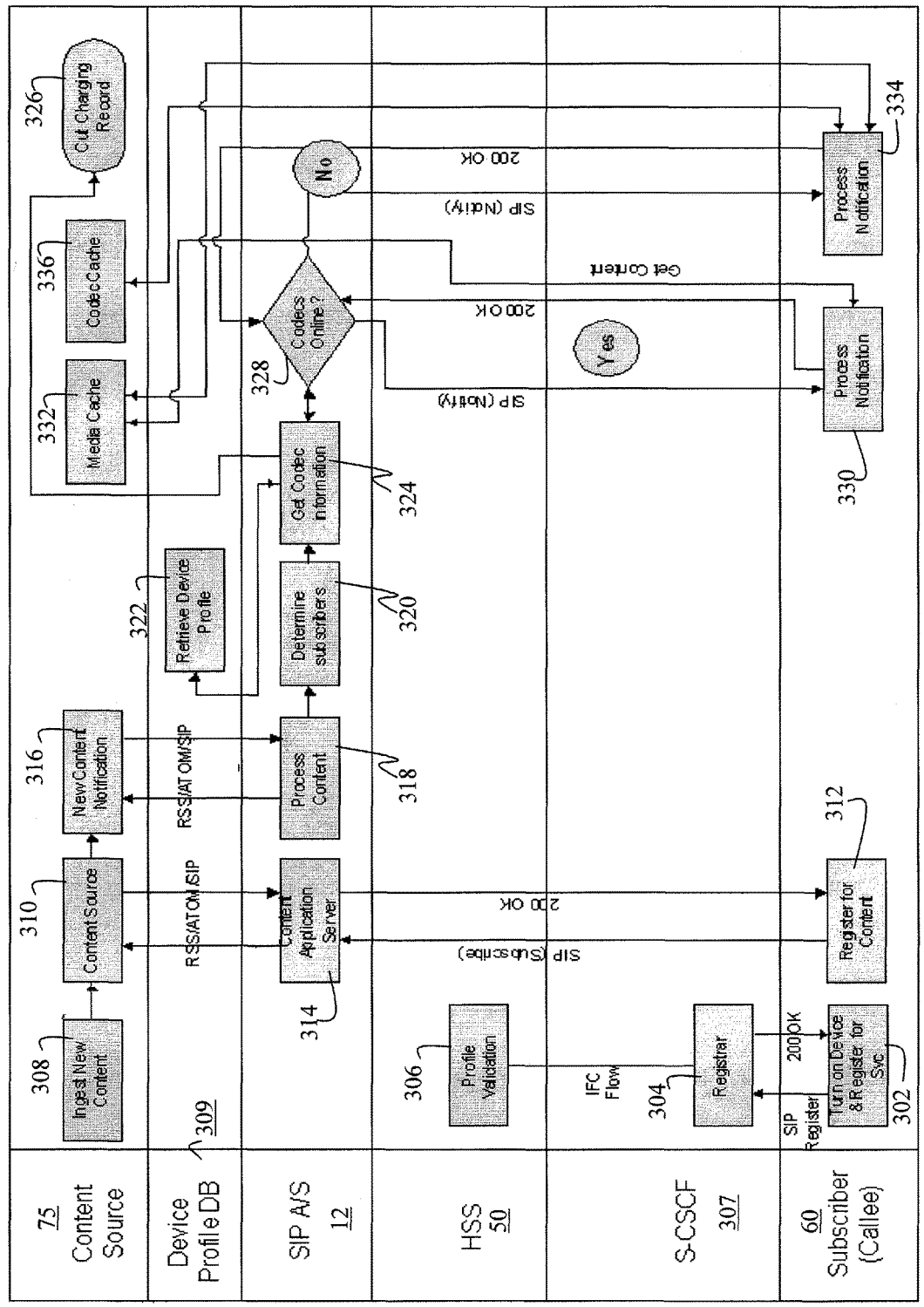

FIG. 3 illustrates exemplary processes in accordance with the present invention. The steps of FIG. 3 may be implemented on the computer infrastructure of FIG. 1 and/or the architecture of FIG. 2, for example. The flow diagram (swim lane diagram) in FIG. 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In the flow of FIG. 3, six roles are shown: a subscribing user 60, an S-CSCF 307, the HSS 50, the SIP application server 12, a device profile database 309 and a content source 75. At step 302, a subscribing user turns on the device and registers for a service. In embodiments, the registration is performed using SIP notification. At step 304, the S-CSCF registers the device and provides a 200 OK signal. At step 306, the HSS registers the user profile and provides profile validation.

At step 308, the content source ingests (provides) the new content. At step 310, the content source posts the content to the application service and more specifically the SIP application server. At step 312, the subscribing user registers for content with the SIP application server. In embodiments, the registration is performed using SIP notification. At step 314, the SIP application server registers the subscribing user with the content source and provides a 200 OK signal to the subscribing user. At step 314, the SIP application server can also register with the content source by RSS, ATOM feed or SIP based messaging.

At step 316, the content source provides a new content notification to the SIP application server. The new content notification can be provided on one of several different communication channels. For example, the new content notification can be provided by RSS, ATOM feed or SIP based messaging. At step 318, the SIP application server processes the new content.

At step 320, the SIP application server determines which subscribing users have subscribed to the content. At step 322, the device profile database retrieves the device profile and sends the profile to the SIP application server. At step 324, the SIP application server retrieves the codec information. At step 326, the content source receives the record from the SIP application server and generates a charging record. In embodiments, the charging record is generated at the charging platform.

At step 328, a determination is made as to whether the device of the subscribing user requires the codec online. If yes, the device of the subscribing user can process the notification at step 330 and obtain the content at step 332 from the media cache, with the codec on line. The codec can be provided by a SIP message.

At step 328, if the determination is that the device of the subscribing user does not have the codec (or require the codec online), at step 334, the device of the subscribing user can process the notification and obtain the codec at step 336, offline. The codec request will be by a SIP message. At step 332, the device of the subscribing user can obtain the content from the media cache. The notification at steps 330 and 334 can be provided by a SIP notify, in which case the device of the subscribing user can process the notification and provide a 200 OK message to the SIP application server.

Figure 4:
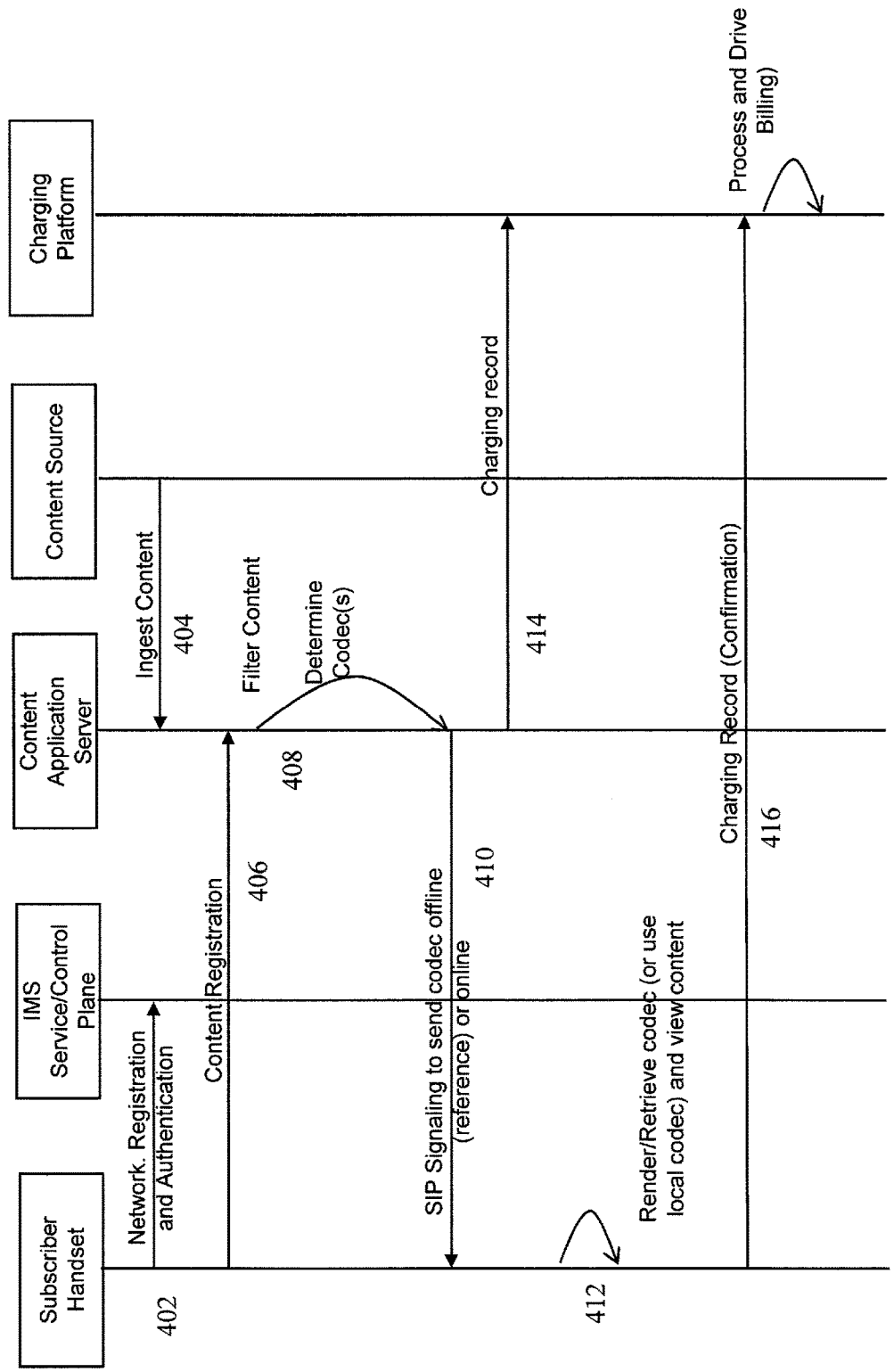

FIG. 4 is a swim lane diagram showing an overview process in accordance with aspects of the present invention. FIG. 4 shows five players: subscriber handset, IMS service/control plane; content application server; content source; and charging platform. At step 402, the subscriber handset registers with the telecommunications network at the IMS service/control plane, e.g., a SIP Registration. As part of the registration process, the handset goes through an Initial Filter Criteria (IFC) process and authentication as required. Those of skill in the art should understand that the Initial Filter Criteria is the grouping between a Trigger Point (the logical expression matching a message) and an Application Server. The absence of a Trigger Point in an Initial Filter Criteria indicates that the message should always be forwarded to the respective Application Server. Each Initial Filter Criteria can be set to match only when the respective user on which it is set is registered or unregistered or in both cases.

At step 404, as a parallel process, content ingestion continues via the SIP content application server that is already in the network. In embodiments, the content is a combination of content that is ingested and then transcoded, as well as metadata associated with content that is not directly ingested, for example. At optional step 406, the handset (subscriber) can register for specific types of content, e.g., a certain type of feed or content. At step 408, the content application server can perform filtering and codec processing.

At step 410, as and when the requested content is available, the content application server notifies the handset (SIP) and then includes any codecs that may be necessary to transcode the content at the device end (handset). Alternatively, references to the codec can be sent using the SIP signaling channel. In embodiments, in most cases, only references to the actual content are sent. At step 412, the handset transcodes the content (using the codec information provided or local codec) and then renders (views) the content. At steps 414 and 416, accounting records are generated and sent to the charging platform both from the content server as well as from the handset to support flexible charging models.

Example Usage

The following are several examples implementing the present invention. The following examples are provided for illustration and should not be considered limiting features of the present invention. Additionally, the following examples are provided to show implementations of the present invention to better understand the advantages and features realized by using the system (architecture) and method thereof.

In a first example, subscriber A, with a SIP phone, registers with a presence server for some content that relates to another subscriber, Subscriber B. Subscriber B films a short clip with his/her device. The SIP application server (presence server) notifies subscriber A of the new content. Subscriber A decides to watch the content via a set top box on a television. The set top box is made aware of the codec to use to up-convert the content.

In another example, subscriber B wants to view the content on a handset, which has different media capabilities than the film made using, e.g., the handset of Subscriber A. Subscriber B's handset receives a SIP notification that includes the codec in SIP notification along with a reference to the content. This notifies the handset of subscriber B of the type of content and the how to view the content. The handset of subscriber B can then retrieve the codec offline from a codec cache or receive the codec in the SIP message.

In yet another example, an insurance adjuster films an accident scene and uploads the video to a central network platform, which realizes that there are multiple rendering platforms within the insurance company's corporate environments. Additionally, there is a need for colleagues of the insurance adjuster to also view the content in near real time. The IMS network infrastructure makes the codec necessary for multi-device viewing available on the server along with a media cache, and the subscribers are notified of the codec (via a reference in the SIP Notify) and download and use the codec to view the content on their respective endpoints.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method implemented on a computer infrastructure comprising:
    determining, by a computing device, that one or more requesting devices have subscribed to receive digital media content from a remote content server, wherein the one or more requesting devices are remote from the computing device;
    subscribing, by the computing device, to the digital media content on the content server;
    receiving, by the computing device, the digital media content from the remote content server;
    determining, by the computing device, a codec associated with the digital media content to be sent to the one or more requesting devices;
    determining, by the computing device, that at least one of the one or more requesting devices does not have the codec associated with the digital media content to be sent to the one or more requesting devices based on one or more device profiles of the one or more requesting devices;
    determining, by the computing device, using the one or more device profiles of the one or more requesting devices, whether to use a first mode to send the codec associated with the digital media content or use a second mode to send a reference to the codec associated with the digital media content;
    in response to determining to use the first mode, sending, by the computing device and through an online network, the codec associated with the digital media content to be sent to the one or more requesting devices, to the at least one of the one or more requesting devices after at least one of the one or more requesting devices is determined to not have the codec so that the at least one of the one or more requesting devices does not need to determine and search for the codec associated with the digital media content;
    in response to determining to use the second mode, sending, by the computing device, the reference to the codec to the at least one of the one or more requesting devices via a Session Initiation Protocol (SIP) message; and
    sending the digital media content to the one or more requesting devices.

2. The method of claim 1, wherein the codec is sent by a Session Initiation Protocol (SIP) message online with the content.

3. The method of claim 1, further comprising sending the codec to the at least one of the one or more requesting devices after receiving a request related to the reference.

4. The method of claim 1, further comprising retrieving the one or more device profiles from a central repository to determine that the at least one of the one or more requesting devices do not have the codec associated with the content.

5. The method of claim 1, further comprising generating a charging record for at least one of the content and codec information.

6. The method of claim 1, further comprising receiving presence information using SIP from the at least one of the one or more requesting devices.

7. The method of claim 1, wherein the steps are provided on a computing infrastructure which is at least one of maintained, deployed, created and supported by a service provider.

8. The method of claim 1, wherein the steps are provided on a software component, a hardware component or a combination of the software component and the hardware component.

9. The method of claim 1, wherein the at least one of the one or more requesting devices dynamically and automatically applies the codec to render the content in the at least one of the one or more requesting devices.

10. The method of claim 1, further comprising receiving, by the computing device, a new content notification from the content server.

* * * * *